(12) United States Patent
Wang et al.

(10) Patent No.: US 9,907,068 B2
(45) Date of Patent: Feb. 27, 2018

(54) METHOD FOR NEGOTIATING INTER-ENB FUNCTIONS, APPARATUS AND SYSTEM THEREFOR

(71) Applicant: FUJITSU LIMITED, Kawasaki-shi, Kanagawa (JP)

(72) Inventors: Weiwei Wang, Beijing (CN); Zhaojun Li, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 148 days.

(21) Appl. No.: 14/790,502

(22) Filed: Jul. 2, 2015

(65) Prior Publication Data

US 2015/0305020 A1 Oct. 22, 2015

Related U.S. Application Data

(63) Continuation of application No. PCT/CN2013/070471, filed on Jan. 15, 2013.

(51) Int. Cl.
*H04W 4/00* (2009.01)
*H04W 72/04* (2009.01)
(Continued)

(52) U.S. Cl.
CPC ....... *H04W 72/0426* (2013.01); *H04W 92/20* (2013.01); *H04W 28/18* (2013.01); *H04W 72/0486* (2013.01)

(58) Field of Classification Search
CPC .......................... H04W 72/04; H04W 72/0426
(Continued)

(56) References Cited

U.S. PATENT DOCUMENTS

2009/0180428 A1* 7/2009 Viswanath ............ H04W 48/20
370/328
2011/0194483 A1* 8/2011 Ji ....................... H04W 36/0033
370/315
(Continued)

FOREIGN PATENT DOCUMENTS

CN 102045780 A 5/2011
CN 102131256 A 7/2011
(Continued)

OTHER PUBLICATIONS

International Preliminary Report on Patentability with Written Opinion of the International Searching Authority for corresponding International Patent Application No. PCT/CN2013/070471 dated Jul. 30, 2015 with English translation.

(Continued)

*Primary Examiner* — Farah Faroul
(74) *Attorney, Agent, or Firm* — Myers Wolin, LLC

(57) ABSTRACT

Embodiments of the present disclosure provide a method for negotiating inter-eNB functions, an apparatus and system therefor. The method includes: transmitting, by an eNB, a backhaul type of the eNB, and/or a backhaul type of at least one neighboring eNB of the eNB, to another eNB negotiating inter-eNB functions with the eNB, so that the other eNB negotiates with the eNB for inter-eNB functions. With the method and apparatus of the embodiments of the present disclosure, the eNBs may be assisted in negotiating inter-eNB functions, thereby providing better services to UEs.

25 Claims, 9 Drawing Sheets

101 transmitting, by an eNB, a backhaul type of the eNB, and/or a backhaul type of at least one neighboring eNB of the eNB, to another eNB

102 receiving, by the eNB, a backhaul type of the other eNB, and/or a backhaul type of at least one neighboring eNB of the other eNB, fed back by the other eNB

(51) Int. Cl.
*H04W 92/20* (2009.01)
*H04W 28/18* (2009.01)

(58) Field of Classification Search
USPC .......................................................... 370/252
See application file for complete search history.

(56) References Cited

U.S. PATENT DOCUMENTS

| | | | |
|---|---|---|---|
| 2011/0249642 A1 | 10/2011 | Song et al. | |
| 2011/0255486 A1* | 10/2011 | Luo | H04W 48/12 370/329 |
| 2012/0039208 A1 | 2/2012 | Aydin | |
| 2012/0063343 A1* | 3/2012 | Yuda | H04L 1/0026 370/252 |
| 2012/0063383 A1* | 3/2012 | Barbieri | H04W 72/082 370/315 |
| 2012/0155561 A1* | 6/2012 | Seo | H04B 7/15542 375/260 |
| 2012/0300654 A1 | 11/2012 | Gan et al. | |
| 2012/0307633 A1 | 12/2012 | Collings et al. | |
| 2012/0307716 A1 | 12/2012 | Zhao et al. | |
| 2013/0003548 A1* | 1/2013 | Sridhar | H04L 47/125 370/235 |
| 2013/0089159 A1* | 4/2013 | Liu | H04B 7/024 375/267 |
| 2013/0294352 A1* | 11/2013 | Park | H04B 7/024 370/328 |
| 2013/0310052 A1* | 11/2013 | Timus | H04W 72/0433 455/445 |
| 2014/0192734 A1* | 7/2014 | Ng | H04L 5/0035 370/329 |
| 2014/0314003 A1* | 10/2014 | Zhou | H04W 48/16 370/329 |
| 2015/0003301 A1* | 1/2015 | He | H04B 7/0452 370/280 |
| 2015/0078162 A1* | 3/2015 | Prakash | H04W 28/10 370/235 |
| 2015/0282222 A1* | 10/2015 | Yan | H04W 76/022 370/329 |

FOREIGN PATENT DOCUMENTS

| | | |
|---|---|---|
| CN | 102611525 A | 7/2012 |
| EP | 2 532 201 | 12/2012 |
| KR | 10-2012-0014004 A | 2/2012 |
| WO | 2005/125021 A2 | 12/2005 |
| WO | 2010/124725 A1 | 11/2010 |
| WO | 2010/124938 A1 | 11/2010 |
| WO | 2011/076266 A1 | 6/2011 |
| WO | 2011/093670 A2 | 8/2011 |
| WO | 2011/094926 A1 | 8/2011 |
| WO | 2012/084035 A1 | 6/2012 |
| WO | 2012/120077 A1 | 9/2012 |
| WO | 2012/127364 A1 | 9/2012 |
| WO | 2012/152176 A1 | 11/2012 |

OTHER PUBLICATIONS

Notice of Preliminary Rejection issued by the Korean Intellectual Property Office for corresponding Korean Patent Application No. 10-2015-7018714, dated Mar. 16, 2016, with English translation.
First Office Action issued by the Japan Patent Office for corresponding Japanese Patent Application No. 2015-551952, dated Aug. 23, 2016, with an English translation.
CMCC, "Discussion on scenarios for small cell enhancement in Rel-12", Agenda Item: 6.3.5, 3GPP TSG-RAN WG1 #71, R1-125061, New Orleans, Louisiana, USA, Nov. 12-16, 2012.
3GPP TR 36.932 V12.0.0, "3rd Generation Partnership Project; Technical Specification Group Radio Access Network; Scenarios and Requirements for Small Cell Enhancements for E-UTRA and E-UTRAN (Release 12)", Dec. 2012.
International Search Report issued for corresponding International Patent Application No. PCT/CN2013/070471 dated Oct. 24, 2013, with English translation.
Extended European Search Report, supplementary European search report and European search opinion for corresponding European patent application No. 13871544.6 dated Jul. 27, 2016.

* cited by examiner ically to the present disclosure and for easy under-

METHOD FOR NEGOTIATING INTER-ENB FUNCTIONS, APPARATUS AND SYSTEM THEREFOR

CROSS REFERENCE TO RELATED APPLICATIONS

This application is a continuation application of International Application PCT/CN2013/070471 filed on Jan. 15, 2013, the entire contents of which are incorporated herein by reference.

TECHNICAL FIELD

The present disclosure relates to the field of communications, and in particular to a method for negotiating inter-eNB functions, an apparatus and system therefor.

BACKGROUND

In the prior art, when multiple eNBs are needed to serve the same user equipment (UE) by coordinating, a backhaul type of the eNBs becomes very important. For example, in a small cell scenario, a backhaul type of an eNB determines performance of inter-eNB communication, such as latency, throughput, and latency jitter, etc., thereby determining inter-eNB functions, such as inter-eNB carrier aggregation (CA), and inter-eNB coordinated multi-point (CoMP) transmission, etc.

In the implementation of the present disclosure, the inventors found that as information on a backhaul of an eNB is known only by Operation Administration and Maintenance (OAM) currently, two eNBs negotiating with each other cannot determine a backhaul type of the counterpart, nor can obtain performance of the backhaul of the counterpart, thereby affecting services to UEs. For example, when latency of a backhaul between two eNBs is relatively large, if a function having a relatively high requirement on latency is started, performance of UE shall be affected.

It should be noted that the above description of the background art is merely provided for clear and complete explanation of the present disclosure and for easy understanding by those skilled in the art. And it should not be understood that the above technical solution is known to those skilled in the art as it is described in the background art of the present disclosure.

SUMMARY

An object of the embodiments of the present disclosure is to provide a method for negotiating inter-eNB functions, an apparatus and system therefor, which can assist eNBs in negotiating inter-eNB functions, thereby providing better services to UEs.

According to a first aspect of the embodiments of the present disclosure, there is provided a method for negotiating inter-eNB functions, including:

Transmitting, by an eNB, a backhaul type of the eNB, and/or a backhaul type of at least one neighboring eNB of the eNB, to another eNB negotiating inter-eNB functions with the eNB, so that the other eNB negotiates with the eNB for inter-eNB functions.

According to a second aspect of the embodiments of the present disclosure, there is provided a method for negotiating inter-eNB functions, including:

receiving, by an eNB, a backhaul type of another eNB negotiating inter-eNB functions with the eNB, and/or a backhaul type of at least one neighboring eNB of the other eNB, transmitted by the other eNB, so that the other eNB negotiates with the eNB for inter-eNB functions.

According to a third aspect of the embodiments of the present disclosure, there is provided an eNB, including:

a first transmitting unit configured to transmit a backhaul type of the eNB, and/or a backhaul type of at least one neighboring eNB of the eNB, to another eNB negotiating inter-eNB functions with the eNB.

According to a fourth aspect of the embodiments of the present disclosure, there is provided an eNB, including:

a first receiving unit configured to receive a backhaul type of another eNB negotiating inter-eNB functions with the eNB, and/or a backhaul type of at least one neighboring eNB of the other eNB, transmitted by the other eNB, so that the other eNB negotiates with the eNB for inter-eNB functions.

According to a fifth aspect of the embodiments of the present disclosure, there is provided a method for negotiating inter-eNB functions, including:

receiving, by an eNB, a measurement result of parameters of a backhaul of another eNB negotiating inter-eNB functions with the eNB transmitted by the other eNB, and negotiating inter-eNB functions with the other eNB according to the measurement result.

According to a sixth aspect of the embodiments of the present disclosure, there is provided a method for negotiating inter-eNB functions, further including:

Measuring, by an eNB, parameters of a backhaul of the eNB; and transmitting a measurement result of the parameters of the backhaul of the eNB by the eNB to another eNB negotiating inter-eNB functions with the eNB.

According to a seventh aspect of the embodiments of the present disclosure, there is provided an eNB, including:

a first receiving unit configured to receive a measurement result of parameters of a backhaul of another eNB negotiating inter-eNB functions with the eNB transmitted by the other eNB.

According to an eighth aspect of the embodiments of the present disclosure, there is provided an eNB, including:

a measuring unit configured to measure parameters of a backhaul of the eNB; and a first transmitting unit configured to transmit a measurement result of the measuring unit to another eNB negotiating inter-eNB functions with the eNB.

According to a ninth aspect of the embodiments of the present disclosure, there is provided a method for negotiating inter-eNB functions, including:

transmitting a request message for inter-eNB functions by an eNB to another eNB negotiating inter-eNB functions with the eNB, so that the other eNB negotiates with the eNB for inter-eNB functions; and receiving, by the eNB, a response message for inter-eNB functions fed back by the other eNB, the response message for inter-eNB functions including an inter-eNB function can be accepted by the other eNB, or the response message for inter-eNB functions including information on rejection to the request.

According to a tenth aspect of the embodiments of the present disclosure, there is provided a method for negotiating inter-eNB functions, including:

receiving, by an eNB, a request message for inter-eNB functions transmitted by another eNB negotiating inter-eNB functions with the eNB;

determining an inter-eNB function can be accepted by the eNB according to the request message for inter-eNB functions; and transmitting a response message for inter-eNB functions by the eNB to the other eNB, the response message for inter-eNB functions including the inter-eNB functions can be accepted by the eNB, or the response message for inter-eNB functions including information on rejection to the request.

According to an eleventh aspect of the embodiments of the present disclosure, there is provided an eNB, including:

a first transmitting unit configured to transmit a request message for inter-eNB functions to other eNB negotiating inter-eNB functions with the eNB, so that the other eNB negotiates with the eNB for inter-eNB functions; and a first receiving unit configured to receive a response message for inter-eNB functions fed back by the other eNB, the response message for inter-eNB functions including inter-eNB functions can be accepted by the other eNB, or the response message for inter-eNB functions including information on rejection to the request.

According to a twelfth aspect of the embodiments of the present disclosure, there is provided an eNB, including:

a first receiving unit configured to receive a request message for inter-eNB functions transmitted by another eNB negotiating inter-eNB functions with the eNB;

a first determining unit configured to determine inter-eNB functions can be accepted by the eNB according to the request message for inter-eNB functions; and a first transmitting unit configured to transmit a response message for inter-eNB functions to the other eNB, the response message for inter-eNB functions including inter-eNB functions can be accepted by the eNB, or the response message for inter-eNB functions including information on rejection to the request.

According to a thirteenth aspect of the embodiments of the present disclosure, there is provided a communication system, including the eNBs as described in the third and fourth aspects, or including the eNBs as described in the seventh and eighth aspects, or including the eNBs as described in the eleventh and twelfth aspects.

According to another aspect of the embodiments of the present disclosure, there is provided a computer-readable program, wherein when the program is executed in an eNB, the program enables a computer to carry out the method for negotiating inter-eNB functions as described in any one of the third, fourth, seventh, eighth, eleventh or twelfth aspects in the eNB.

According to a further aspect of the embodiments of the present disclosure, there is provided a storage medium in which a computer-readable program is stored, wherein the computer-readable program enables a computer to carry out the method for negotiating inter-eNB functions as described in any one of the third, fourth, seventh, eighth, eleventh or twelfth aspects in an eNB.

An advantage of the embodiments of the present disclosure exists in that the eNBs may be assisted in negotiating inter-eNB functions, thereby providing better services to UEs.

With reference to the following description and drawings, the particular embodiments of the present disclosure are disclosed in detail, and the principle of the present disclosure and the manners of use are indicated. It should be understood that the scope of the embodiments of the present disclosure is not limited thereto. The embodiments of the present disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings described below are some embodiments of the present disclosure only, and to those skilled in the art, other accompanying drawings may be obtained according to these accompanying drawings without making an inventive effort.

In the drawings.

DETAILED DESCRIPTION

The foregoing and other features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents falling within the spirit and terms of the appended claims.

Currently, when multiple eNBs are needed to serve the same UE by coordinating, two eNBs negotiating with each other cannot determine a backhaul type of the counterpart, nor can obtain performance of the backhaul of the counterpart, thereby affecting services to UEs.

Embodiments of the present disclosure provide a method for negotiating inter-eNB functions, an apparatus and system therefor. For eNBs coordinated with each other, they may be assisted in negotiating inter-eNB functions by interacting backhaul types of the eNBs, or reporting a measurement result of measuring backhaul performance, or transmitting a request for inter-eNB functions, thereby providing better services to UEs.

The method for negotiating inter-eNB functions, the apparatus and the system of the present disclosure shall be described in detail below with reference to the accompanying drawings taking a first eNB and a second eNB coordinated with each other as examples. However, the embodiments of the present disclosure are not limited thereto, and the method of the embodiments of the present disclosure is also applicable to multiple eNBs coordinated with each other.

Embodiment 1

Figure 1:
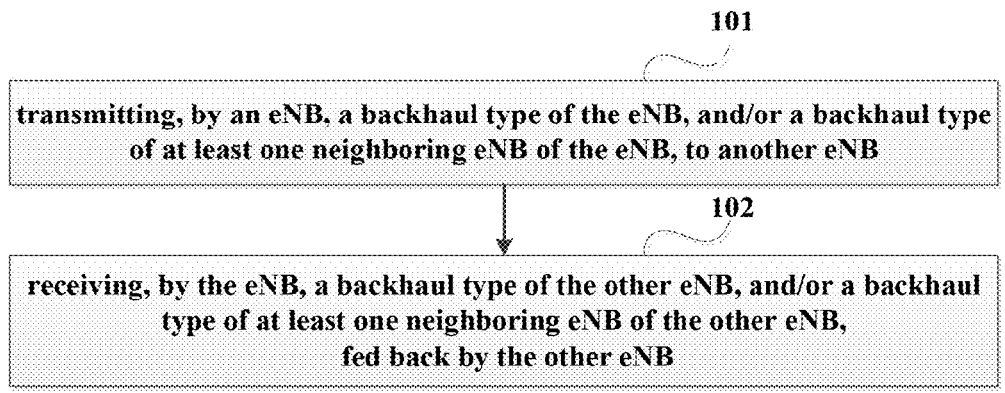
FIG. 1 is a flowchart of an implementation of the method for negotiating inter-eNB functions of Embodiment 1 of the present disclosure.

Embodiment 1 of the present disclosure provides a method for negotiating inter-eNB functions. FIG. 1 is a flowchart of the method. Referring to FIG. 1, the method includes:

step 101: transmitting, by an eNB (a first eNB), a backhaul type of the eNB, and/or a backhaul type of at least one neighboring eNB of the eNB, to another eNB (a second eNB).

In this embodiment, the other eNB (the second eNB) refers to an eNB negotiating with the eNB (the first eNB) for inter-eNB functions, which is briefly referred to as "another eNB" for convenience of description.

With the method of this embodiment, after obtaining information on the backhaul type of the first eNB, and/or the backhaul type of the neighboring eNB of the first eNB, the second eNB may determine the inter-eNB functions (between the first eNB and the second eNB) according to the backhaul type of the first eNB, thereby providing better services to UEs.

In an implementation of this embodiment, after step 101, the method may further include:

step 102: receiving, by the eNB, a backhaul type of the other eNB, and/or a backhaul type of at least one neighboring eNB of the other eNB, fed back by the other eNB.

Furthermore, with the method of this embodiment, after obtaining information on the backhaul type of the second eNB, and/or the backhaul type of the neighboring eNB of the second eNB, the first eNB may determine the inter-eNB functions (between the first eNB and the second eNB) according to the backhaul type of the second eNB, thereby providing better services to UEs.

Figure 2:
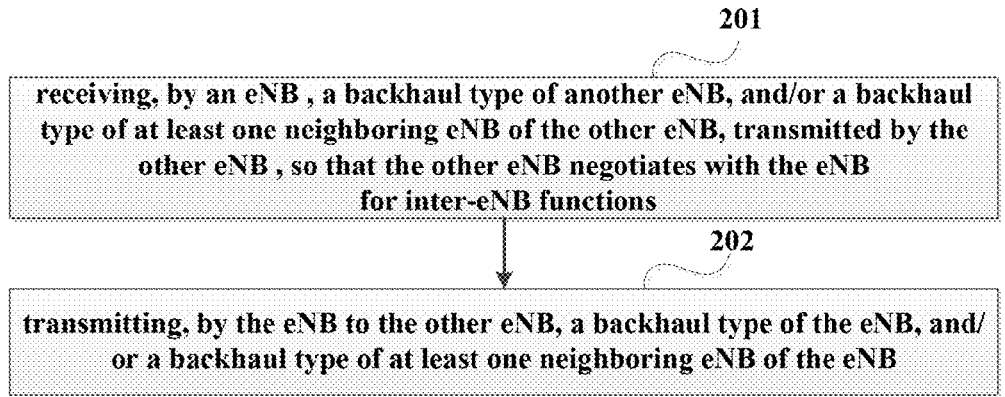
FIG. 2 is a flowchart of another implementation of the method for negotiating inter-eNB functions of Embodiment 1 of the present disclosure.

Corresponding to the method shown in FIG. 1, an embodiment of the present disclosure further provides a method for negotiating inter-eNB functions. FIG. 2 is a flowchart of the method. The method shown in FIG. 2 is processing of another eNB (a second eNB) corresponding to the method shown in FIG. 1. Referring to FIG. 2, the method includes:

step 201: receiving, by an eNB (a second eNB), a backhaul type of another eNB (a first eNB), and/or a backhaul type of at least one neighboring eNB of the other eNB (the first eNB), transmitted by the other eNB (the first eNB), so that the other eNB (the first eNB) negotiates with the eNB (the second eNB) for inter-eNB functions.

With the method of this embodiment, after obtaining information on the backhaul type of the first eNB, and/or the backhaul type of the neighboring eNB of the first eNB, the second eNB may determine the inter-eNB functions (between the first eNB and the second eNB) according to the backhaul type of the first eNB, thereby providing better services to UEs.

In an implementation of this embodiment, corresponding to step 102 shown in FIG. 1, the method of this embodiment further includes:

step 202: transmitting, by the eNB to the other eNB, a backhaul type of the eNB, and/or a backhaul type of at least one neighboring eNB of the eNB.

Furthermore, with the method of this embodiment, after obtaining information on the backhaul type of the second eNB, and/or the backhaul type of the neighboring eNB of the second eNB, the first eNB may determine the inter-eNB functions (between the first eNB and the second eNB) according to the backhaul type of the second eNB, thereby providing better services to UEs.

Figure 3:
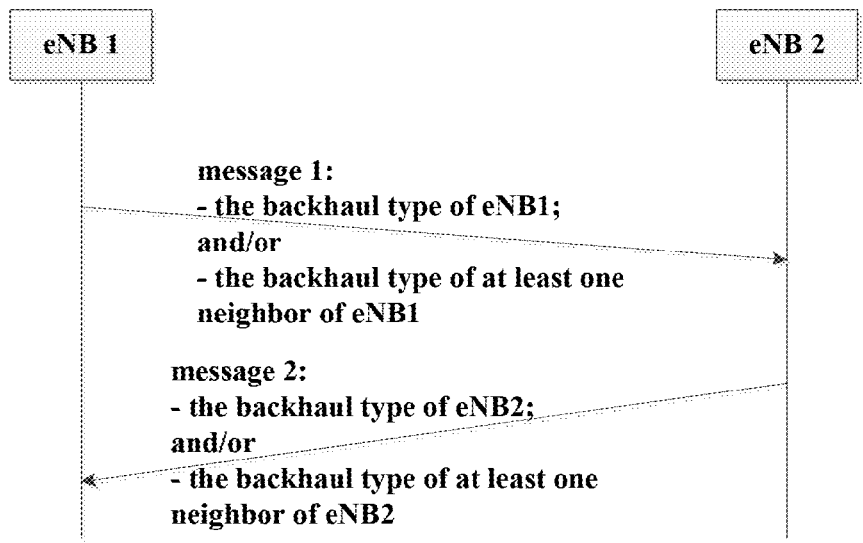
FIG. 3 is a schematic diagram of interaction between eNBs of the method for negotiating inter-eNB functions of Embodiment 1 of the present disclosure.

FIG. 3 is a schematic diagram of interaction between the first eNB (eNB1) and the second eNB (eNB2) corresponding to the methods of FIG. 1 and FIG. 2. As shown in FIG. 3, eNB1 transmits a message 1 to eNB2, the message 1 includes the backhaul type of eNB1 and/or the backhaul type of at least one neighbor of eNB1. Therefore, eNB2 may determine the functions between eNB1 and eNB2, so as to provide better services to UEs. As shown in FIG. 3, eNB2 may also transmit a message 2 to eNB1, the message 2 includes the backhaul type of eNB2 and/or the backhaul type of at least one neighbor of eNB2. Therefore, eNB1 may determine the functions between eNB1 and eNB2, so as to provide better services to UEs.

In the embodiments shown in FIG. 1 and FIG. 2, interacted information on the backhaul types may be names of backhaul types, such as fiber access, digital subscriber line access, cable, wireless backhaul, and/or ideal backhaul; or may be parameters of backhauls corresponding to the names of backhaul types, such as parameters to which the fiber access, digital subscriber line access, cable, wireless backhaul, and/or ideal backhaul correspond, and the parameters here may be any combination of inter-eNB latency, inter-eNB throughput, and inter-eNB latency jitter, etc., however, this embodiment is not limited thereto; or may be identifiers of backhauls corresponding to the names of backhaul types, such as identifiers to which the fiber access, digital subscriber line access, cable, wireless backhaul, and/or ideal backhaul correspond, and the identifiers here may be serial numbers of the backhaul types, however, this embodiment is not limited thereto.

Table 1 below shows names of seven backhaul types currently defined in TS36.932 v 1.0.0 and corresponding parameters of latency and throughput:

TABLE 1

| Backhaul type | Latency (one way) | Throughput |
|---|---|---|
| Fiber Access 1 | 10-30 ms | 10M-10 Gbps |
| Fiber Access 2 | 5-10 ms | 100-1000 Mbps |
| DSL access | 15-60 ms | 10-100 Mbps |
| Cable | 25-35 ms | 10-100 Mbps |
| Wireless backhaul | 5-35 ms | 10 Mbps-100 Mbps (typical values), which may also reach Gbps |
| Fiber 3 (close to an ideal backhaul) | 2-5 ms | 50 Mbps-10 Gbps |
| Ideal backhaul | Very low latency | Very high throughput |

Taking the interaction flow shown in FIG. 3 and the backhaul types shown in Table 1 as examples, the message 1 or the message 2 may include names of the backhaul types in column 1 of Table 1, or may include the latency in column 2 of Table 1, or may include the throughput in column 3 of Table 1, or may include the contents in any two or three columns of Table 1, or may include the identifiers corresponding to the backhaul types. For example, when the backhaul type of eNB1 is fiber access 2, DSL access and wireless backhaul, the message 1 may include the name of the above backhaul types, that is "fiber access 2, DSL access and wireless backhaul"; or the message 1 may include the parameters to which each backhaul type correspond, and, taking that a parameter to which "latency" corresponds is only included as an example (however, this embodiment is not limited thereto, and a parameter to which throughput corresponds may only be included, or a parameter to which latency jitter corresponds may only be included, or any combination of the above parameters may be included at the same time), contents included in the message 1 are "5-10 ms, 15-60 ms, 5-35 ms"; or the message 1 may include the identifiers to which each backhaul type correspond, and, taking that an identifier to which fiber access 2 corresponds is "2", an identifier to which DSL access corresponds is "3" and an identifier to which wireless backhaul corresponds is "5" as an example, contents included in the message 1 are "2, 3, 5".

In this embodiment, the backhaul types shown in the above table are examples only, and as the development of technologies, other types may be added, and this embodiment of the present disclosure is not limited thereto.

In this embodiment, the parameters to which the backhaul types shown in the above table correspond are also examples only. For example, the parameters to which the backhaul types correspond may further include latency jitter or others, and this embodiment is not limited thereto.

In this embodiment, the message 1 may be an X2 setup request message, and the message 2 may be an X2 setup response message. However, this embodiment is not limited thereto, and any message capable of interacting backhaul types are covered by the protection scope of the present disclosure.

With the method of the embodiment of the present disclosure, the information on backhauls of the eNBs is interacted between eNBs coordinated with each other, and the eNBs may be assisted in negotiating inter-eNB functions, thereby providing better services to UEs.

Embodiment 2

Figure 4:
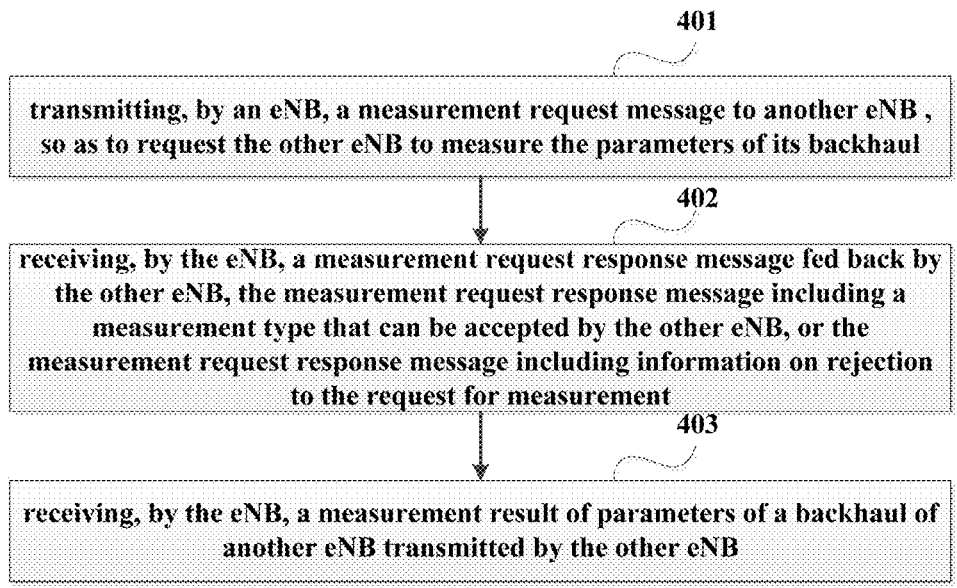
FIG. 4 is a flowchart of an implementation of the method for negotiating inter-eNB functions of Embodiment 2 of the present disclosure.

Embodiment 2 of the present disclosure provides a method for negotiating inter-eNB functions. FIG. 4 is a flowchart of the method. Referring to FIG. 4, the method includes:

step 403: receiving, by an eNB (a first eNB), a measurement result of parameters of a backhaul of another eNB (a second eNB) transmitted by the other eNB.

In this embodiment, when two eNBs obtain the backhaul types of the counterpart according to OAM configuration or the method of Embodiment 1, either eNB may measure each parameter of its backhaul, such as measuring all parameters of its backhaul, or may measure a part of the parameters of its backhaul according to a predetermined policy, and report a measurement result to another eNB negotiating with it for inter-eNB functions. In this way, the other eNB may negotiate the inter-eNB functions according to the measurement result after obtaining the measurement result.

With the method of this embodiment, after obtaining the measurement result of the parameters of the backhaul type of the second eNB, the first eNB may determine the inter-eNB functions (between the first eNB and the second eNB) according to the measurement result, thereby providing better services to UEs.

In an implementation of this embodiment, before step 403, the method may further include:

step 401: transmitting a measurement request message by the eNB (the first eNB) to the other eNB (the second eNB), so as to request the other eNB to measure the parameters of its backhaul;

In this embodiment, the measurement request message may request for at least one of the following measurement types:

latency between the first eNB and the second eNB, the latency being one-way latency, or two-way latency, and this embodiment being not limited thereto;

throughput between the first eNB and the second eNB;

latency jitter between the first eNB and the second eNB; and a buffer status.

In this embodiment, the buffer status may be empty buffer or occupied buffer status, wherein the buffer status may be a statistical result of all buffer statuses, and may also be a buffer status based on each queue, and queues may be divided based on QoS requirements or priorities of buffer datas, however, this embodiment is not limited thereto.

In this embodiment, the above measurement types are illustrative only, in particular implementation, other parameters may be requested to be measured, and this embodiment is not limited thereto.

Step 402: receiving, by the eNB (the first eNB), a measurement request response message fed back by the other eNB (the second eNB), the measurement request response message including a measurement type that can be accepted by the other eNB, or the measurement request response message including information on rejection to the request for measurement.

In this embodiment, after receiving the above measurement request message, the second eNB will determine acceptable measurement types according to the requested measurement type indicated by the measurement request message. If there exists an acceptable measurement type, the acceptable measurement type is transmitted to the first eNB via the above response message; and if all measurement types are unacceptable, information on rejection to the request for measurement is transmitted to the first eNB via the above response message.

Furthermore, with the method of this embodiment, after determining the measurement type requested by the first eNB, the second eNB may measure parameters of the backhaul of the acceptable measurement type, and report a measurement result to the first eNB. Therefore, the first eNB may better determine the functions (between the first eNB and the second eNB), thereby providing better services to UEs.

Figure 5:
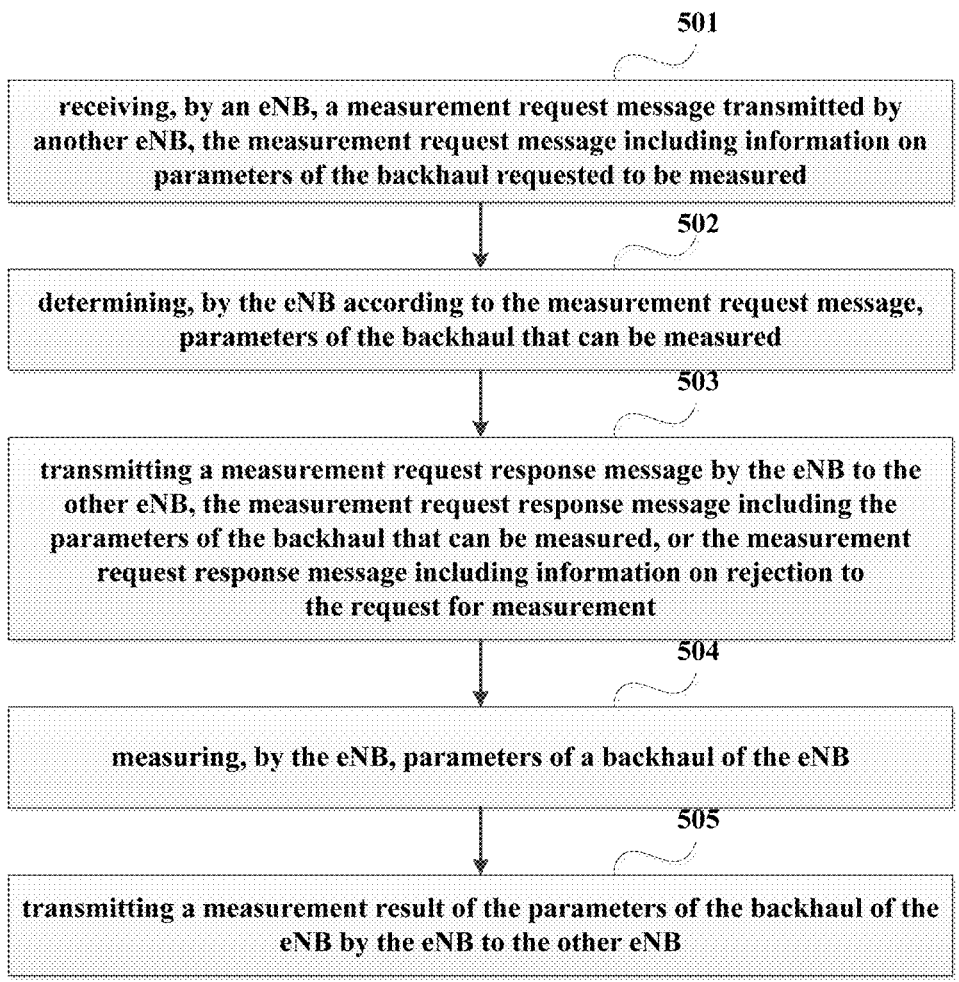
FIG. 5 is a flowchart of another implementation of the method for negotiating inter-eNB functions of Embodiment 2 of the present disclosure.

Corresponding to the method shown in FIG. 4, an embodiment of the present disclosure further provides a method for negotiating inter-eNB functions. FIG. 5 is a flowchart of the method. The method shown in FIG. 5 is processing of another eNB (a second eNB) corresponding to the method shown in FIG. 4. Referring to FIG. 5, the method includes:

step 504: measuring, by an eNB (a second eNB), parameters of a backhaul of the eNB;

wherein, the eNB may measure the parameters of its backhaul after obtaining a backhaul type of an eNB negotiating inter-eNB functions with it, an existed scheme may be employed for performing the measurement, and this embodiment is not limited thereto;

wherein, a method for obtaining the above backhaul type may be obtained via OAM configuration, and may also be obtained via the method of Embodiment 1, and this embodiment is not limited thereto;

step 505: transmitting a measurement result of the parameters of the backhaul of the eNB by the eNB (the second eNB) to the other eNB (the first eNB).

In this embodiment, corresponding to step 403 of FIG. 4, the second eNB may directly start the measurement of the backhaul after obtaining the backhaul type via OAM configuration or the method of Embodiment 1, and report a measurement result to the first eNB. Therefore, the first eNB may determine the inter-eNB functions, thereby providing better services to UEs.

In an implementation of this embodiment, corresponding to steps 401 and 402 of FIG. 4, the method of this embodiment further includes:

step 501: receiving, by the eNB (the second eNB), a measurement request message transmitted by the other eNB (the first eNB), the measurement request message including information on parameters of the backhaul requested to be measured;

wherein, the measurement request message is the measurement request message transmitted by the first eNB in step 401, the contents of which being incorporated herein, and being not going to be described herein any further;

step 502: determining, by the eNB (the second eNB) according to the measurement request message, parameters of the backhaul that can be measured;

wherein, the first eNB indicates the requested measurement type via the measurement request message, and the second eNB may determine the acceptable measurement types according to the measurement request message;

step 503: transmitting a measurement request response message by the eNB (the second eNB) to the other eNB (the first eNB), the measurement request response message including the parameters of the backhaul that can be measured, or the measurement request response message including information on rejection to the request for measurement.

In this embodiment, if the second eNB determines according to the measurement request message that there exists an acceptable measurement type, it reports the acceptable measurement type to the first eNB via the measurement request response message; and if there exists no acceptable measurement type, it reports the information on rejection to the request for measurement to the first eNB via the measurement request response message.

After step 503 is executed, the second eNB may measure the parameters of the backhaul of the acceptable measurement type after determining the measurement type requested by the first eNB, and report a measurement result to the first eNB. Therefore, the first eNB may better determine the functions (between the first eNB and the second), thereby providing better services to UEs.

Figure 6:
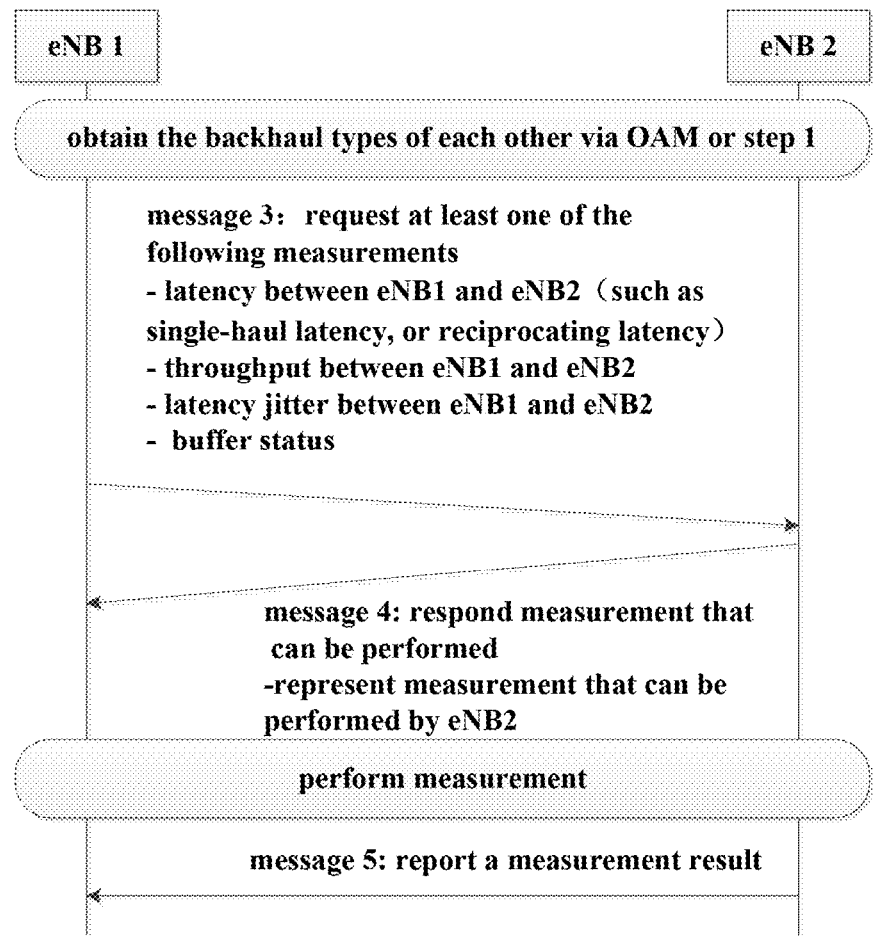
FIG. 6 is a schematic diagram of interaction between eNBs of the method for negotiating inter-eNB functions of Embodiment 2 of the present disclosure.

FIG. 6 is a schematic diagram of interaction between the first eNB (eNB1) and the second eNB (eNB2) corresponding to the methods of FIG. 4 and FIG. 5. As shown in FIG. 6, if the two eNBs obtain the backhaul types of each other via OAM configuration or the method of Embodiment 1, either eNB may start a performance update process shown in FIG. 3. That is, although the embodiment of FIG. 6 also employs eNB1 and eNB2 to represent the first eNB and the second eNB respectively, in particular implementation, eNB1 shown in FIG. 6 may be the first eNB of Embodiment 1, and may also be the second eNB of Embodiment 1; likewise, eNB2 shown in FIG. 6 may be the first eNB of Embodiment 1, and may also be the second eNB of Embodiment 1.

Referring to FIG. 6, eNB1 transmits a message 3 to eNB2, requesting eNB2 to perform measurement of some parameters of a backhaul (such as latency, throughput, latency jitter, and a buffer status, etc.). If the measurement is accepted, eNB2 responds measurement that can be performed by it to eNB1 via a message 4; and if the measurement is rejected, eNB2 responds information on rejection to the request for measurement to eNB1 via the message 4. Thereafter, eNB2 may perform measurement of an acceptable measurement type, and report a measurement result to eNB1 via a message 5.

In this embodiment, as described above, the message 3 and the message 4 may be omitted, that is, after obtaining the backhaul types of each other, eNB1 and eNB2 may directly start measurement of backhauls, and then update a measurement result via the message 5.

In this embodiment, the message 3 may be a resource status request message. When eNB2 responds measurement that can be performed to the eNB1, the message 4 may be a resource status response message; and when the measurement request is rejected, the message 4 may be a resource status failure message. And the message 5 may be a resource status update message. Similar to the preceding embodiment, types of messages 3-5 are not limited in this embodiment, and all message types are covered by the protection scope of the present disclosure only if they can fulfill respective functions.

With the method of the embodiment of the present disclosure, the information on backhauls of the eNBs is interacted between eNBs coordinated with each other, and by measuring the parameters of the backhauls and reporting the measurement results, the eNBs may be assisted in negotiating inter-eNB functions, thereby providing better services to UEs.

Embodiment 3

Figure 7:
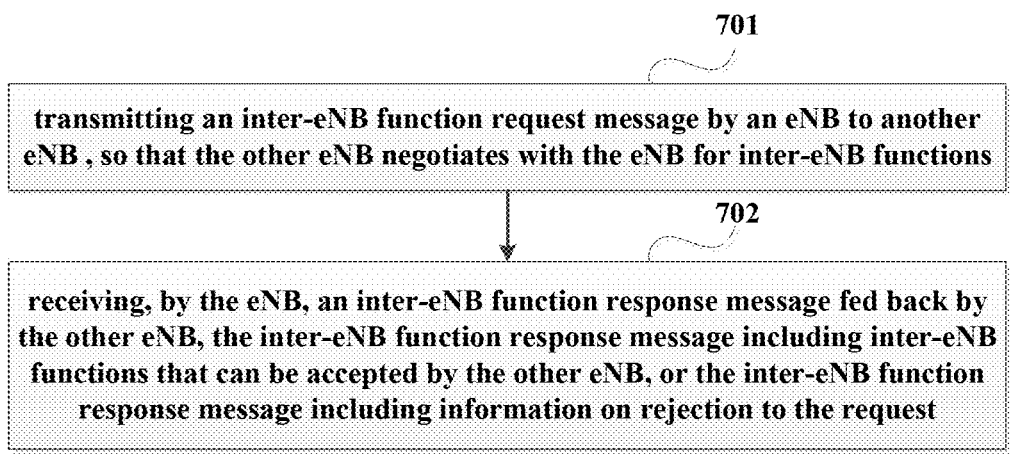
FIG. 7 is flowchart of an implementation of the method for negotiating inter-eNB functions of Embodiment 3 of the present disclosure.

Embodiment 3 of the present disclosure provides a method for negotiating inter-eNB functions. FIG. 7 is a flowchart of the method. Referring to FIG. 7, the method includes:

step 701: transmitting an inter-eNB function request message by an eNB (a first eNB) to another eNB (a second eNB), so that the other eNB (the second eNB) negotiates with the eNB (the first eNB) for inter-eNB functions;

wherein, the first eNB requests for at least one inter-eNB function, such as an inter-eNB CA (carrier aggregation) function 1, and an inter-eNB CA function 2, etc., and/or an inter-eNB CoMP (Coordinated Multiple Points) function 1, and an inter-eNB CoMP function 2, etc., by transmitting the inter-eNB function request message to the second eNB, however, this embodiment is not limited thereto;

step 702: receiving, by the eNB (the first eNB), an inter-eNB function response message fed back by the other eNB (the second eNB), the inter-eNB function response message including inter-eNB functions that can be accepted by the other eNB (the second eNB), or the inter-eNB function response message including information on rejection to the request.

In this embodiment, the second eNB may determine acceptable inter-eNB functions according to the inter-eNB functions requested by the first eNB and responds a determination result to the first eNB. If there exists an acceptable inter-eNB function, the second eNB feeds back the acceptable inter-eNB function to the first eNB; and if there exists no acceptable inter-eNB function, the second eNB feeds back the information on rejection to the request to the first eNB.

With the method of this embodiment, negotiation of inter-eNB functions may be achieved via the request message and response message of inter-eNB functions.

Figure 8:
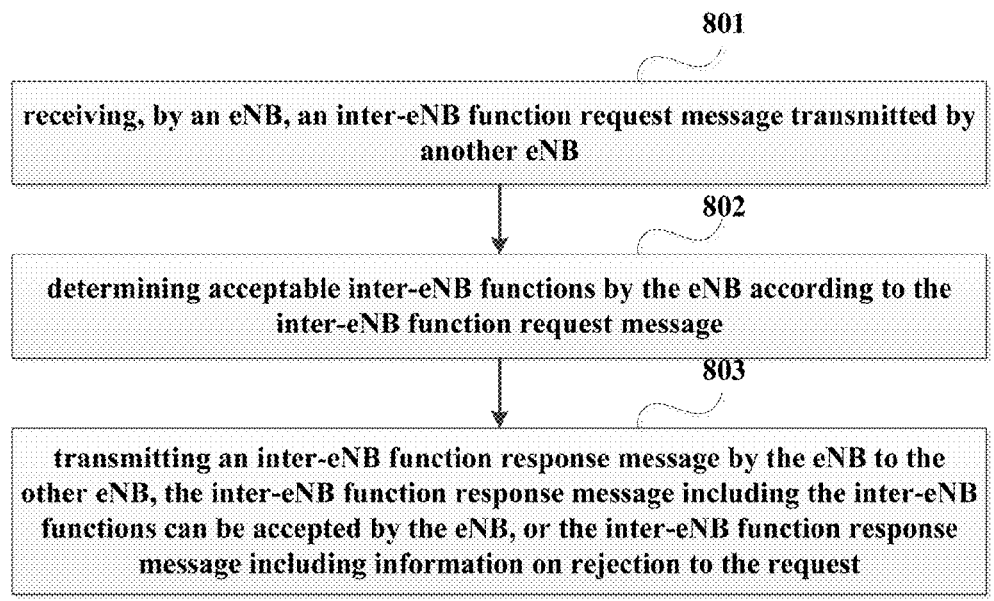
FIG. 8 is a flowchart of another implementation of the method for negotiating inter-eNB functions of Embodiment 3 of the present disclosure.

Corresponding to the method shown in FIG. 7, an embodiment of the present disclosure further provides a method for negotiating inter-eNB functions. FIG. 8 is a flowchart of the method. The method shown in FIG. 8 is processing of another eNB (a second eNB) corresponding to the method shown in FIG. 7. Referring to FIG. 8, the method includes:

step 801: receiving, by an eNB (a second eNB), an inter-eNB function request message transmitted by another eNB (a first eNB);

step 802: determining acceptable inter-eNB functions by the eNB (the second eNB) according to the inter-eNB function request message; and step 803: transmitting an inter-eNB function response message by the eNB (the second eNB) to the other eNB (the first eNB), the inter-eNB function response message including the inter-eNB functions can be accepted by the eNB, or the inter-eNB function response message including information on rejection to the request.

With the method of this embodiment, negotiation of inter-eNB functions may be achieved via the request message and response message of inter-eNB functions.

Figure 9:
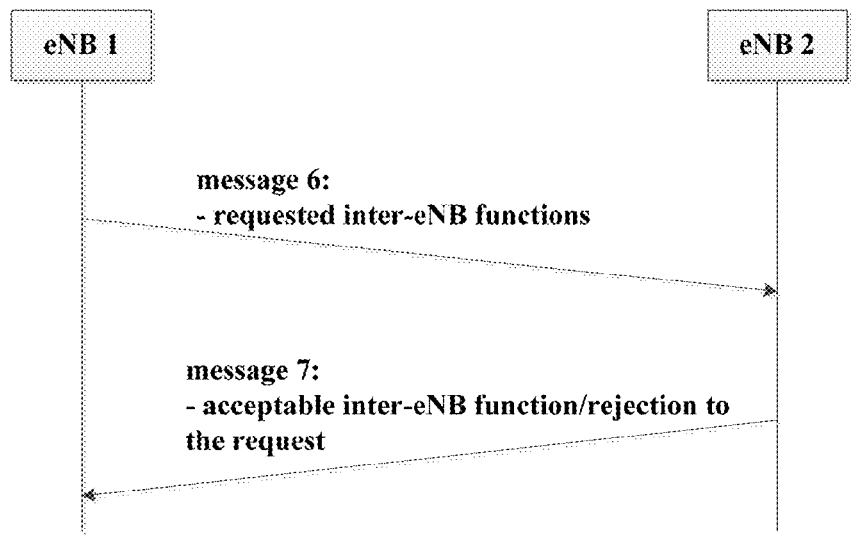
FIG. 9 is a schematic diagram of interaction between eNBs of the method for negotiating inter-eNB functions of Embodiment 3 of the present disclosure.

FIG. 9 is a schematic diagram of interaction between the first eNB (eNB1) and the second eNB (eNB2) corresponding to the methods of FIG. 7 and FIG. 8. Similar to Embodiment 2, in this embodiment, although the embodiment shown in FIG. 9 also employs eNB1 and eNB2 to represent a first eNB and a second eNB respectively, in particular implementation, eNB1 of the embodiment shown in FIG. 9 may be the first eNB of Embodiment 1 or Embodiment 2, and may also be the second eNB of Embodiment 1 or Embodiment 2; likewise, eNB2 of the embodiment shown in FIG. 9 may be the first eNB of Embodiment 1 or Embodiment 2, and may also be the second eNB of Embodiment 1 or Embodiment 2.

Referring to FIG. 9, eNB1 transmits a message 6 to eNB2, the message 6 includes requested inter-eNB functions, hence, eNB2 may determine the inter-eNB functions that can be accepted. If there exists an acceptable inter-eNB function, eNB2 feeds back the acceptable inter-eNB function to the first eNB via a message 7; and if there exists no acceptable inter-eNB function, eNB2 feeds back information on rejection to the request to eNB1 via the message 7.

In an implementation of this embodiment, the backhaul types may be interacted between the eNBs first according to the method of Embodiment 1, and then negotiation of inter-eNB functions may be performed according to the method of this embodiment. The method of Embodiment 1 has been described in detail in Embodiment 1, and its contents are incorporated herein, and shall not be described herein any further.

In another implementation of this embodiment, the performance of the backhauls may be updated first according to the method of Embodiment 2, and then negotiation of inter-eNB functions may be performed according to the method of this embodiment. The method of Embodiment 2 has been described in detail in Embodiment 2, and its contents are incorporated herein, and shall not be described herein any further.

In a further implementation of this embodiment, the backhaul types may be interacted between the eNBs first according to the method of Embodiment 1, then performance of the backhauls may be updated according to the method of Embodiment 2, and finally, negotiation of inter-eNB functions may be performed according to the method of this embodiment. The methods of Embodiment 1 and Embodiment 2 have been described in detail in Embodiment 1 and Embodiment 2, and their contents are incorporated herein, and shall not be described herein any further.

With the method of this embodiment, negotiation of inter-eNB functions may be performed better, thereby providing better services to UEs.

In the above three embodiments, each message may be performed via an X2 interface or an Si interface, and the embodiments of the present disclosure are not limited thereto.

An embodiment of the present disclosure further provides an eNB, as described in Embodiment 4 below. As the principle of the eNB for solving problems is similar to that of the method of Embodiment 1 or that of a combination of the methods of Embodiment 1 and Embodiment 2, the implementation of the methods of Embodiment 1 and Embodiment 2 may be referred to for the implementation of this embodiment, and the repeated parts shall not be described any further.

Embodiment 4

Figure 10:
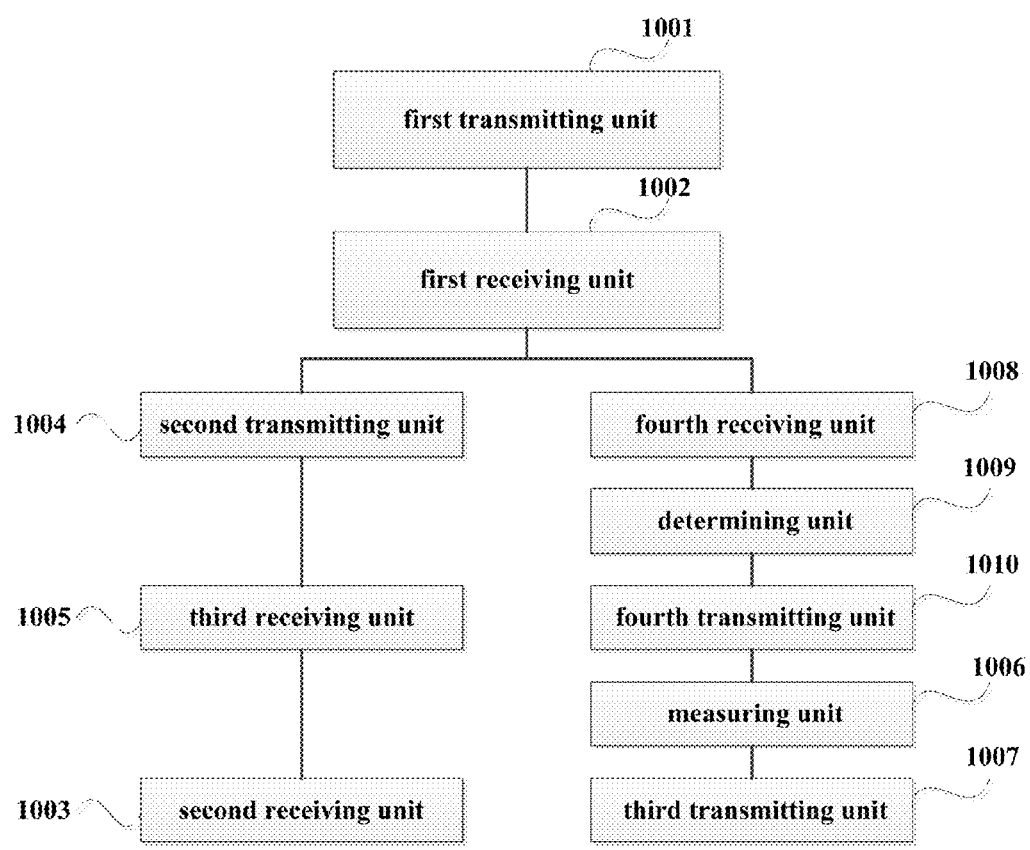
FIG. 10 is a schematic diagram of a structure of an implementation of the eNB corresponding to Embodiment 1 or Embodiment 1 and Embodiment 2.

An embodiment of the present disclosure further provides an eNB. FIG. 10 is a schematic diagram of the structure of the eNB. Referring to FIG. 10, the eNB includes:

a first transmitting unit 1001 configured to transmit a backhaul type of the eNB, and/or a backhaul type of at least one neighboring eNB of the eNB, to another eNB. In an implementation, the eNB may further include:

a first receiving unit 1002 configured to receive a backhaul type of the other eNB, and/or a backhaul type of at least one neighboring eNB of the other eNB, from the other eNB.

In this embodiment, the backhaul type includes fiber access, digital subscriber line access, cable, wireless backhaul, and/or ideal backhaul, or the backhaul type includes parameters to which the fiber access, digital subscriber line access, cable, wireless backhaul, and/or ideal backhaul correspond, or the backhaul type includes identifiers to which the fiber access, digital subscriber line access, cable, wireless backhaul, and/or ideal backhaul correspond.

In this embodiment, the parameters include: latency, throughput, and/or latency jitter, between the eNB and the other eNB.

In an implementation, the eNB may further include:

a second receiving unit 1003 configured to receive a measurement result of the parameters of the backhaul of the other eNB transmitted by the other eNB.

In this implementation, the eNB further includes:

a second transmitting unit 1004 configured to, before the second receiving unit 1003 receives the measurement result, transmit a measurement request message to the other eNB, so as to request the other eNB to measure the parameters of its backhaul; and a third receiving unit 1005 configured to receive parameters of a backhaul that can be measured or information on rejection to the request for measurement fed back by the other eNB.

In another implementation, the eNB further includes:

a measuring unit 1006 configured to measure parameters of a backhaul of the eNB; and a third transmitting unit 1007 configured to transmit a measurement result of the measuring unit to the other eNB.

In this implementation, the eNB may further include:

a fourth receiving unit 1008 configured to receive a measurement request message transmitted by the other eNB, the measurement request message including information on parameters of the backhaul requested to be measured;

a determining unit 1009 configured to determine according to the measurement request message, parameters of the backhaul that can be measured; and a fourth transmitting unit 1010 configured to transmit a measurement request response message to the other eNB, the measurement request response message including the parameters of the backhaul that can be measured, or the measurement request response message including information on rejection to the request for measurement.

In this embodiment, the parameters of the backhaul requested to be measured include: latency, throughput, and latency jitter, between the eNB and the other eNB, and/or a buffer status of the other eNB.

Figure 11:
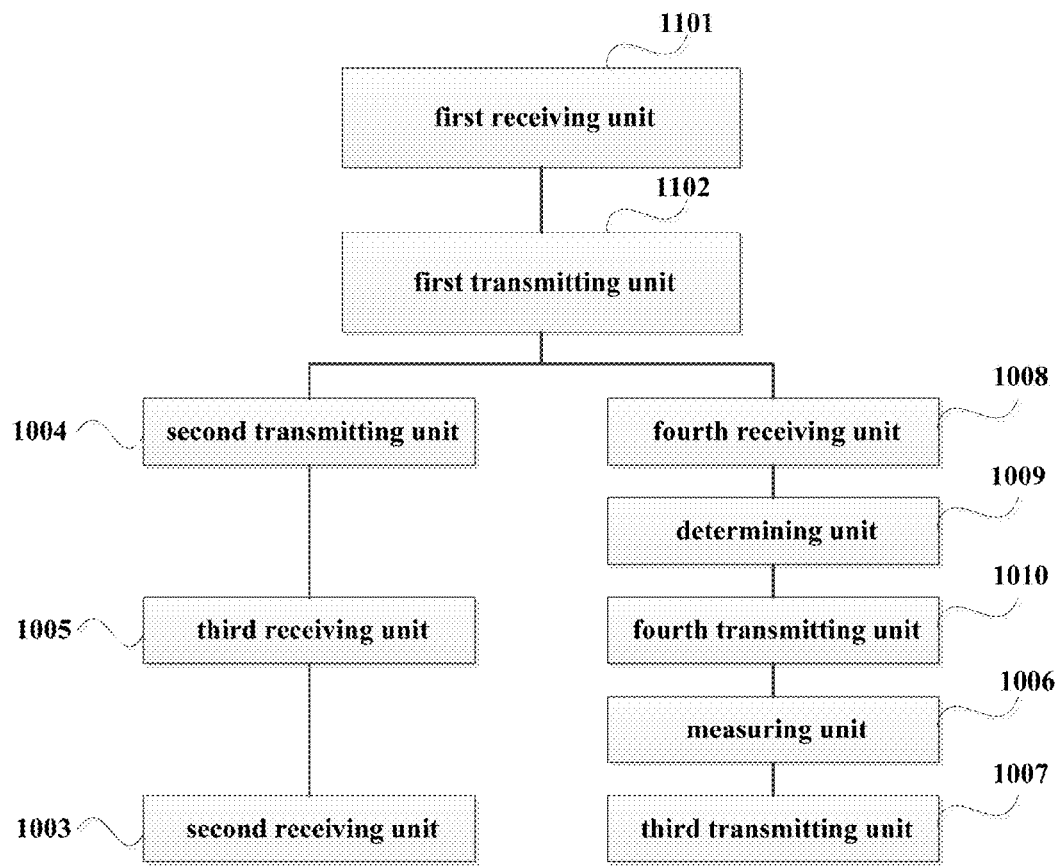
FIG. 11 is a schematic diagram of a structure of another implementation of the eNB corresponding to Embodiment 1 or Embodiment 1 and Embodiment 2.

Corresponding to the eNB shown in FIG. 10, an embodiment of the present disclosure further provides an eNB shown in FIG. 11. Referring to FIG. 11, except functions of a first receiving unit 1101 and a first transmitting unit 1102, structures and functions of other parts of the eNB shown in FIG. 11 are identical to those of the eNB shown in FIG. 10, the contents of which are incorporated herein, and shall not to be described herein any further. Referring to FIG. 11, the functions of the first receiving unit 1101 and the first transmitting unit 1102 of this eNB are as follows respectively:

the first receiving unit 1101 is configured to receive a backhaul type of another eNB, and/or a backhaul type of at least one neighboring eNB of the other eNB, transmitted by the other eNB, so that the other eNB negotiates with the eNB for inter-eNB functions.

In an implementation, the eNB further includes:

a first transmitting unit 1102 configured to transmit to the other eNB, a backhaul type of the eNB, and/or a backhaul type of at least one neighboring eNB of the eNB.

By interacting the information on backhauls and/or by measuring the backhauls and reporting the measurement results according to the eNB of this embodiment, the eNBs may be assisted in negotiating inter-eNB functions, thereby providing better services to UEs.

An embodiment of the present disclosure further provides an eNB, as described in Embodiment 5 below. As the principle of the eNB for solving problems is similar to that of the method of Embodiment 2, the implementation of the method of Embodiment 2 may be referred to for the implementation of this embodiment, and the repeated parts shall not be described any further.

Embodiment 5

Figure 12:
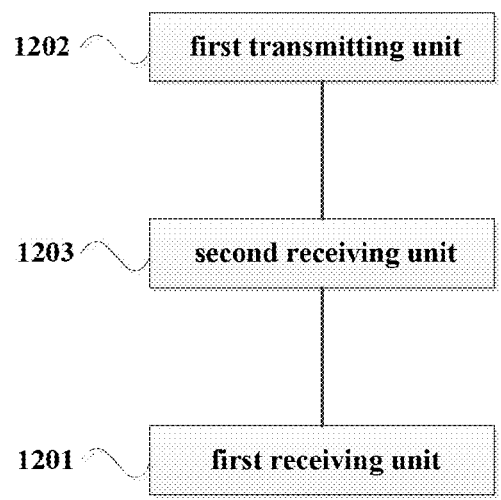
FIG. 12 is a schematic diagram of a structure of an implementation of the eNB corresponding to Embodiment 2.

An embodiment of the present disclosure further provides an eNB, corresponding to eNB1 shown in FIG. 6. FIG. 12 is a schematic diagram of the structure of the eNB. Referring to FIG. 12, the eNB includes:

a first receiving unit 1201 configured to receive a measurement result of parameters of a backhaul of another eNB transmitted by the other eNB.

In an embodiment, the eNB further includes:

a first transmitting unit 1202 configured to, before the first receiving unit 1201 receives the measurement result, transmit a measurement request message to the other eNB, so as to request the other eNB to measure the parameters of its backhaul; and a second receiving unit 1203 configured to receive a measurement request response message fed back by the other eNB, the measurement request response message including measurement of parameters of a backhaul that can be performed by the other eNB, or the measurement request response message including information on rejection to the request for measurement.

In this embodiment, the parameters of the backhaul requested to be measured include: latency, throughput, and latency jitter, between the eNB and the other eNB, and/or a buffer status of the other eNB.

Figure 13:
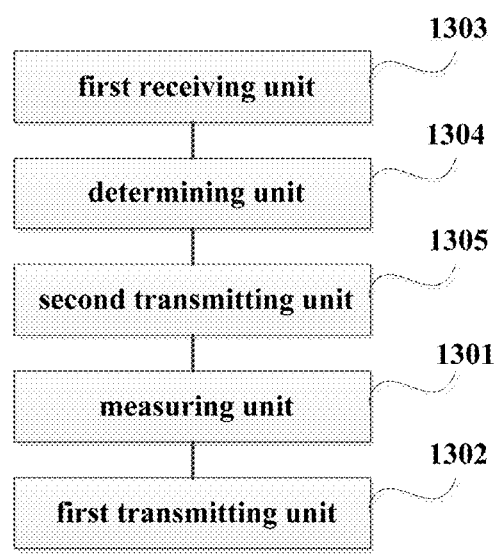
FIG. 13 is a schematic diagram of a structure of another implementation of the eNB corresponding to Embodiment 2.

Corresponding to the eNB shown in FIG. 12, an embodiment of the present disclosure further provides an eNB, which corresponds to eNB2 shown in FIG. 6. FIG. 13 is a schematic diagram of the structure of the eNB. Referring to FIG. 13, the eNB includes:

a measuring unit 1301 configured to measure parameters of a backhaul of the eNB; and a first transmitting unit 1302 configured to transmit a measurement result of the measuring unit to another eNB.

In an embodiment, the eNB further includes:

a first receiving unit 1303 configured to, before the first transmitting unit 1302 transmits the measurement result to the other eNB, receive a measurement request message transmitted by the other eNB, the measurement request message including information on parameters of the backhaul requested to be measured;

a determining unit 1304 configured to determine according to the measurement request message, parameters of the backhaul that can be measured; and a second transmitting unit 1305 configured to transmit a measurement request response message to the other eNB, the measurement request response message including the parameters of the backhaul that can be measured, or the measurement request response message including information on rejection to the request for measurement.

In this embodiment, the parameters of the backhaul requested to be measured include: latency, throughput, and latency jitter, between the eNB and the other eNB, and/or a buffer status of the other eNB.

By measuring the backhauls and reporting the measurement results according to the eNB of this embodiment, the eNBs may be assisted in negotiating inter-eNB functions, thereby providing better services to UEs.

An embodiment of the present disclosure further provides an eNB, as described in Embodiment 6 below. As the principle of the eNB for solving problems is similar to those of the methods of Embodiments 1-3, the implementation of the methods of Embodiments 1-3 may be referred to for the implementation of this embodiment, and the repeated parts shall not be described any further.

Embodiment 6

Figure 14:
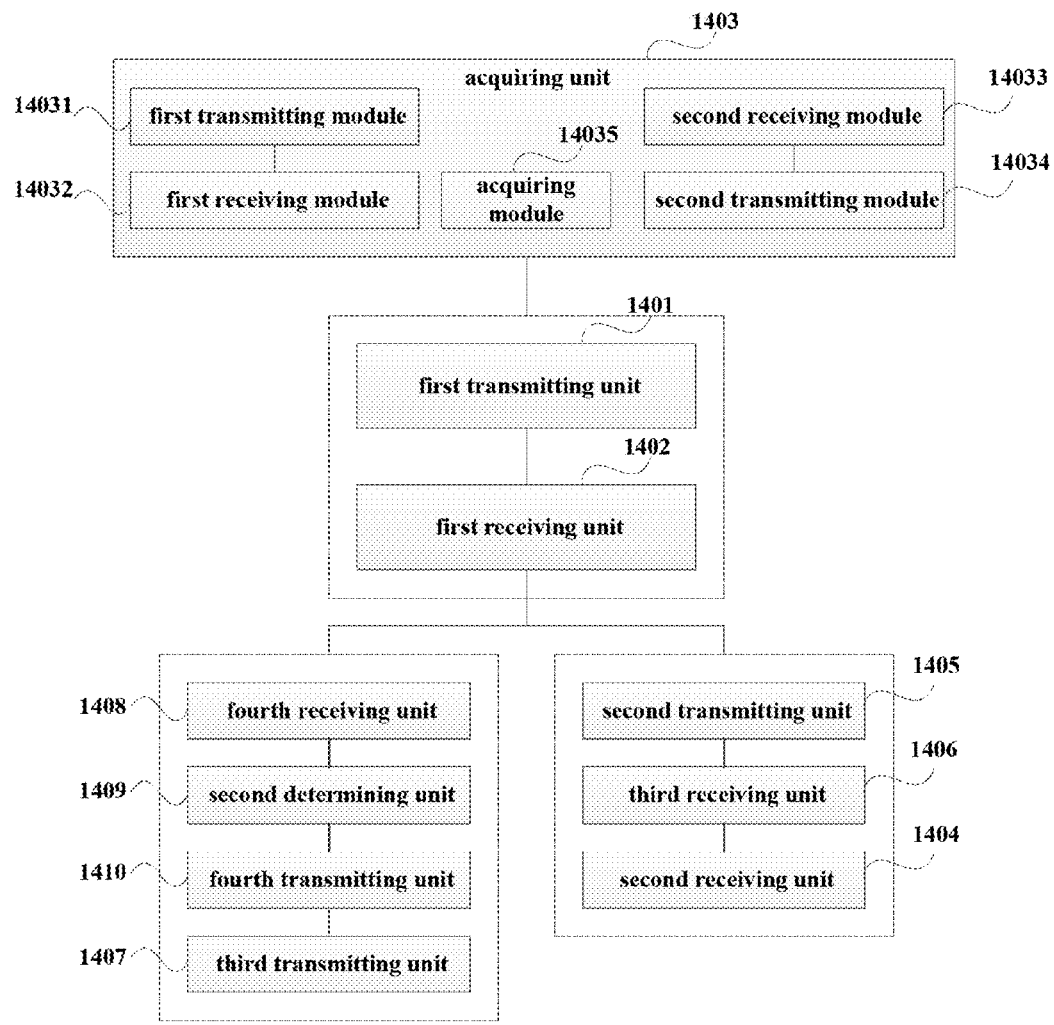
FIG. 14 is a schematic diagram of a structure of an implementation of the eNB corresponding to Embodiment 3 or Embodiments 1 and 3 or Embodiments 2 and 3 or Embodiments 1-3.

An embodiment of the present disclosure further provides an eNB. FIG. 14 is a schematic diagram of the structure of the eNB. Referring to FIG. 14, the eNB includes:

a first transmitting unit 1401 configured to transmit a request message for inter-eNB functions to other eNB, so that the other eNB negotiates with the eNB for inter-eNB functions; and a first receiving unit 1402 configured to receive a response message for inter-eNB functions fed back by the other eNB, the response message for inter-eNB functions including inter-eNB functions can be accepted by the other eNB, or the response message for inter-eNB functions including information on rejection to the request for measurement.

In an implementation, the eNB further includes:

an acquiring unit 1403 configured to obtain a backhaul type of the other eNB before the first transmitting unit transmits the request message for inter-eNB functions to the other eNB or before the first receiving unit receives the request message for inter-eNB functions transmitted by the other eNB.

In an implementation of the acquiring unit 1403, the acquiring unit 1403 includes:

a first transmitting module 14031 configured to transmit a backhaul type of the eNB, and/or a backhaul type of at least one neighboring eNB of the eNB, to the other eNB; and a first receiving module 14032 configured to receive a backhaul type of the other eNB, and/or a backhaul type of at least one neighboring eNB of the other eNB, fed back by the other eNB.

In another implementation of the acquiring unit 1403, the acquiring unit 1403 includes:

a second receiving module 14033 configured to receive a backhaul type of the other eNB, and/or a backhaul type of at least one neighboring eNB of the other eNB, transmitted by the other eNB; and a second transmitting module 14034 configured to transmit a backhaul type of the eNB, and/or a backhaul type of at least one neighboring eNB of the eNB, to the other eNB.

In a further implementation of the acquiring unit 1403, the acquiring unit 1403 includes:

an acquiring module 14035 configured to obtain the backhaul type of the other eNB via Operation Administration and Maintenance (OAM).

In an implementation of this embodiment, the eNB further includes:

a second receiving unit 1404 configured to receive a measurement result of parameters of a backhaul of the other eNB transmitted by the other eNB before the first transmitting unit transmits the request message for inter-eNB functions to the other eNB or before the first receiving unit receives the request message for inter-eNB functions transmitted by other eNB.

In this implementation, the eNB further includes:

a second transmitting unit 1405 configured to transmit a measurement request message to the other eNB before the second receiving unit receives the measurement result of the parameters of the backhaul of the other eNB transmitted by the other eNB, so as to request the other eNB to measure the parameters of its backhaul; and a third receiving unit 1406 configured to receive a measurement request response message fed back by the other eNB, the measurement request response message including measurement of parameters of a backhaul that can be performed by the other eNB, or the measurement request response message including information on rejection to the request for measurement.

In another implementation of this embodiment, the eNB further includes:

a third transmitting unit 1407 configured to transmit a measurement result of parameters of its backhaul to the other eNB before the first transmitting unit transmits the request message for inter-eNB functions to the other eNB, or before the first receiving unit receives the request message for inter-eNB functions transmitted by the other eNB.

In this implementation, the eNB further includes:

a fourth receiving unit 1408 configured to receive a measurement request message transmitted by the other eNB before the third transmitting unit transmits the measurement result of parameters of its backhaul to the other eNB;

a second determining unit 1409 configured to determine according to the measurement request message, parameters of the backhaul that can be measured; and a fourth transmitting unit 1410 configured to transmit a measurement request response message to the other eNB, the measurement request response message including the parameters of the backhaul that can be measured, or the measurement request response message including information on rejection to the request for measurement.

In the above implementation, the backhaul type includes fiber access, digital subscriber line access, cable, wireless backhaul, and/or ideal backhaul, or the backhaul type includes parameters to which the fiber access, digital subscriber line access, cable, wireless backhaul, and/or ideal backhaul correspond, or the backhaul type includes identifiers to which the fiber access, digital subscriber line access, cable, wireless backhaul, and/or ideal backhaul correspond.

In this embodiment, the parameters include: latency, throughput, and/or latency jitter, between the eNB and the other eNB.

In the above implementation, the parameters of the backhaul requested to be measured include: latency, throughput, and latency jitter, between the eNB and the other eNB, and/or a buffer status of the other eNB.

Figure 15:
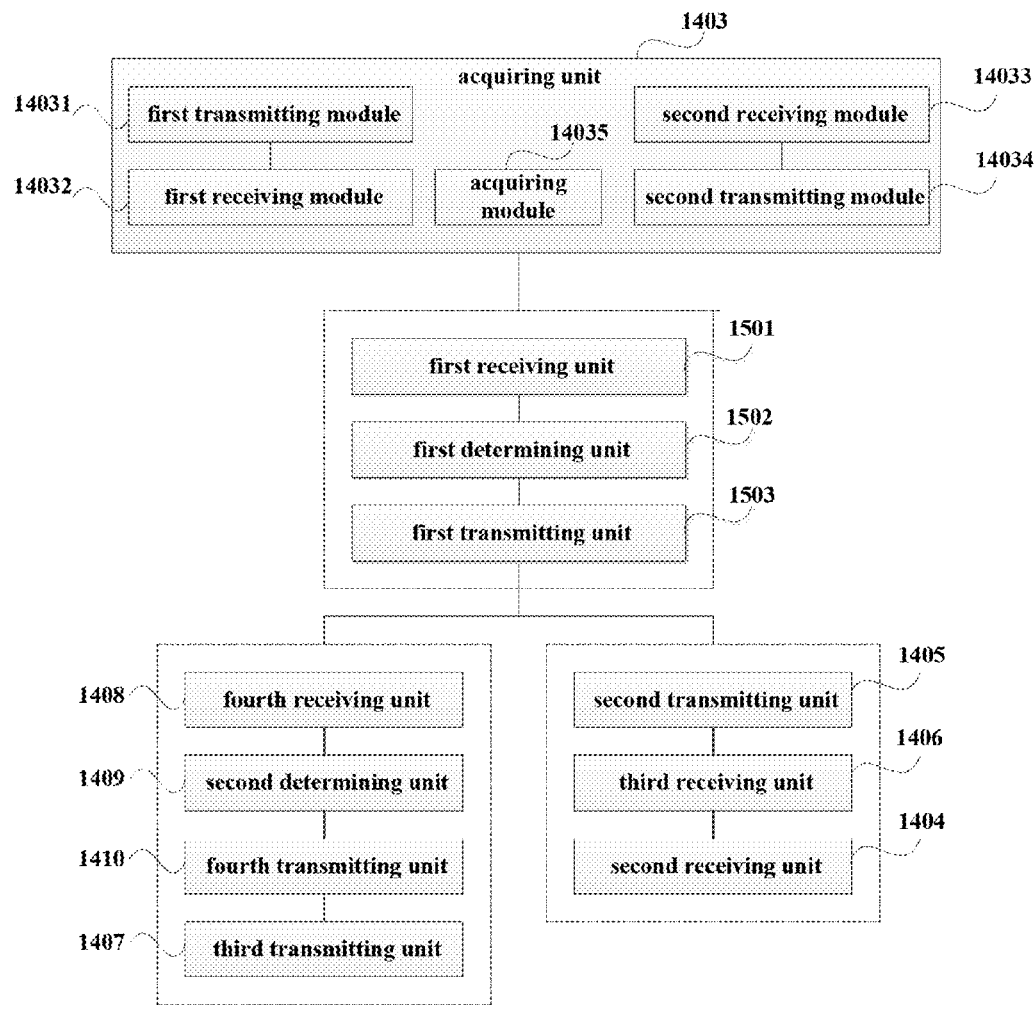
FIG. 15 is a schematic diagram of a structure of another implementation of the eNB corresponding to Embodiment 3 or Embodiments 1 and 3 or Embodiments 2 and 3 or Embodiments 1-3.

Corresponding to the eNB shown in FIG. 14, an embodiment of the present disclosure further provides an eNB shown in FIG. 15. Referring to FIG. 15, except functions of a first receiving unit 1501, a first determining unit 1502 and a first transmitting unit 1503, structures and functions of other parts of the eNB shown in FIG. 15 are identical to those of the eNB shown in FIG. 14, the contents of which are incorporated herein, and shall not to be described herein any further. Referring to FIG. 15, the functions of the first receiving unit 1501, the first determining unit 1502 and the first transmitting unit 1503 of this eNB are as follows respectively:

the first receiving unit 1501 is configured to receive a request message for inter-eNB functions transmitted by another eNB;

the first determining unit 1502 is configured to determine acceptable inter-eNB functions according to the request message for inter-eNB functions; and a first transmitting unit 1503 is configured to transmit a response message for inter-eNB functions to the other eNB, the response message for inter-eNB functions including inter-eNB functions can be accepted by the eNB, or the response message for inter-eNB functions including information on rejection to the request.

By interacting the information on backhauls and/or by measuring the backhauls and reporting the measurement results and/or by negotiating inter-eNB functions according to the eNB of this embodiment, the eNBs may be assisted in negotiating inter-eNB functions, thereby providing better services to UEs.

An embodiment of the present disclosure further provides a communication system, including at least two of the eNBs as described in Embodiment 4, or including at least two of the eNBs as described in Embodiment 5, or including at least two of the eNBs as described in Embodiment 6.

An embodiment of the present disclosure further provides a computer-readable program, wherein when the program is executed in an eNB, the program enables a computer to carry out the method for negotiating inter-eNB functions as described in Embodiments 1-3 in the eNB.

An embodiment of the present disclosure further provides a storage medium in which a computer-readable program is stored, wherein the computer-readable program enables a computer to carry out the method for negotiating inter-eNB functions as described in embodiments 1-3 in an eNB.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

What is claimed is:

1. An eNB, comprising:
a memory that stores a plurality of instructions; and
a processor coupled to the memory and configured to execute the instructions to perform at least one of the following:
transmitting at least one of a backhaul type of the eNB and a backhaul type of at least one neighboring eNB of the eNB, to another eNB negotiating inter-eNB functions with the eNB; and
receiving at least one of a backhaul type of the other eNB and a backhaul type of at least one neighboring eNB of the other eNB, from the other eNB.

2. The eNB according to claim 1, wherein the processor is further configured to execute the instructions to:
receive a measurement result of the parameters of the backhaul of the other eNB transmitted by the other eNB.

3. The eNB according to claim 2, wherein the processor is further configured to execute the instructions to:
before receiving the measurement result, transmit a measurement request to the other eNB, wherein the measurement request is used to request the other eNB to measure the parameters of its backhaul; and
receive parameters of a backhaul that can be measured or information on rejection to the request for measurement fed back by the other eNB.

4. The eNB according to claim 1, wherein the processor is further configured to execute the instructions to:
measure parameters of a backhaul of the eNB; and
transmit a measurement result of the parameters of the backhaul of the eNB to the other eNB.

5. The eNB according to claim 4, wherein the processor is further configured to execute the instructions to:
receive a measurement request message transmitted by the other eNB, the measurement request message comprising information on parameters of the backhaul requested to be measured;
determine according to the measurement request messages, parameters of the backhaul that can be measured; and
transmit a measurement request response message to the other eNB, the measurement request response message comprising the parameters of the backhaul that can be measured, or the measurement request response message comprising information on rejection to the request for measurement.

6. An eNB, comprising:
a memory that stores a plurality of instructions; and
a processor coupled to the memory and configured to execute the instructions to:
receive a measurement result of parameters of a backhaul of another eNB negotiating inter-eNB functions with the eNB transmitted by the other eNB,
wherein the processor is further configured to execute the instructions to:
before receiving the measurement result, transmit a measurement request message to the other eNB, wherein the measurement request message is used to request the other eNB to measure the parameters of its backhaul; and
receive a measurement request response message fed back by the other eNB, the measurement request response message comprising measurement of parameters of a backhaul that can be performed by the other eNB, or the measurement request response message comprising information on rejection to the request for measurement.

7. An eNB, comprising:
a memory that stores a plurality of instructions; and
a processor coupled to the memory and configured to execute the instructions to:
measure parameters of a backhaul of the eNB; and
transmit a measurement result of the parameters of the backhaul of the eNB to another eNB negotiating inter-eNB functions with the eNB,
wherein the processor is further configured to execute the instructions to:
before transmitting the measurement result to the other eNB, receive a measurement request message transmitted by the other eNB, the measurement request message comprising information on parameters of the backhaul requested to be measured;
determine according to the measurement request message, parameters of the backhaul that can be measured; and
transmit a measurement request response message to the other eNB, the measurement request response message comprising the parameters of the backhaul that can be measured, or the measurement request response message comprising information on rejection to the request for measurement.

8. An eNB, comprising:
a memory that stores a plurality of instructions; and
a processor coupled to the memory and configured to execute the instructions to:
transmit a request message for inter-eNB functions to another eNB negotiating inter-eNB functions with the eNB, wherein the request message is used to request the other eNB to negotiate with the eNB for inter-eNB functions; and
receive a response message for inter-eNB functions fed back by the other eNB, the response message for inter-eNB functions comprising inter-eNB functions that can be accepted by the other eNB, or the response message for inter-eNB functions comprising information on rejection to the request.

9. The eNB according to claim 8, wherein the processor is further configured to execute the instructions to:
obtain a backhaul type of the other eNB before transmitting the request message for inter-eNB functions to the other eNB or before receiving the request message for inter-eNB functions transmitted by the other eNB.

10. The eNB according to claim 9, wherein the processor is further configured to execute the instructions to:
transmit at least one of a backhaul type of the eNB and a backhaul type of at least one neighboring eNB of the eNB, to the other eNB; and
receive at least one of the backhaul type of the other eNB and a backhaul type of at least one neighboring eNB of the other eNB, fed back by the other eNB.

11. The eNB according to claim 9, wherein the processor is further configured to execute the instructions to:
receive at least one of the backhaul type of the other eNB and a backhaul type of at least one neighboring eNB of the other eNB, transmitted by the other eNB; and
transmit at least one of a backhaul type of the eNB and a backhaul type of at least one neighboring eNB of the eNB, to the other eNB.

12. The eNB according to claim 9, wherein the processor is further configured to execute the instructions to:
obtain the backhaul type of the other eNB via Operation Administration and Maintenance (OAM).

13. The eNB according to claim 8, wherein the processor is further configured to execute the instructions to:
receive a measurement result of parameters of a backhaul of the other eNB transmitted by the other eNB before transmitting the request message for inter-eNB functions to the other eNB or before receiving the request message for inter-eNB functions transmitted by the other eNB.

14. The eNB according to claim 13, wherein the processor is further configured to execute the instructions to:
transmit a measurement request message to the other eNB before receiving the measurement result of parameters of a backhaul of the other eNB transmitted by the other eNB, wherein the measurement request message is used to request the other eNB to measure the parameters of its backhaul; and
receive a measurement request response message fed back by the other eNB, the measurement request response message comprising measurement of parameters of a backhaul that can be performed by the other eNB, or the measurement request response message comprising information on rejection to the request for measurement.

15. The eNB according to claim 8, wherein the processor is further configured to execute the instructions to:
transmit a measurement result of parameters of its backhaul to the other eNB before transmitting the request message for inter-eNB functions to the other eNB, or before receiving the request message for inter-eNB functions transmitted by the other eNB.

16. The eNB according to claim 15, wherein the processor is further configured to execute the instructions to:
receive a measurement request message transmitted by the other eNB before transmitting the measurement result of parameters of its backhaul to the other eNB;
determine according to the measurement request message, parameters of the backhaul that can be measured; and
transmit a measurement request response message to the other eNB, the measurement request response message comprising the parameters of the backhaul that can be measured, or the measurement request response message comprising information on rejection to the request for measurement.

17. An eNB, comprising:
a memory that stores a plurality of instructions; and
a processor coupled to the memory and configured to execute the instructions to:
receive a request message for inter-eNB functions transmitted by another eNB negotiating inter-eNB functions with the eNB;
determine acceptable inter-eNB functions according to the request message for inter-eNB functions; and
transmit a response message for inter-eNB functions to the other eNB, the response message for inter-eNB functions comprising inter-eNB functions that can be accepted by the eNB, or the response message for inter-eNB functions comprising information on rejection to the request.

18. The eNB according to claim 17, wherein the processor is further configured to execute the instructions to:
obtain a backhaul type of the other eNB before transmitting the request message for inter-eNB functions to the other eNB or before receiving the request message for inter-eNB functions transmitted by the other eNB.

19. The eNB according to claim 18, wherein the processor is further configured to execute the instructions to:
transmit at least one of a backhaul type of the eNB and a backhaul type of at least one neighboring eNB of the eNB, to the other eNB; and
receive at least one of the backhaul type of the other eNB and a backhaul type of at least one neighboring eNB of the other eNB, fed back by the other eNB.

20. The eNB according to claim 18, wherein the processor is further configured to execute the instructions to:
receive at least one of the backhaul type of the other eNB and a backhaul type of at least one neighboring eNB of the other eNB, transmitted by the other eNB; and
transmit at least one of a backhaul type of the eNB and a backhaul type of at least one neighboring eNB of the eNB, to the other eNB.

21. The eNB according to claim 18, wherein the processor is further configured to execute the instructions to:
obtain the backhaul type of the other eNB via Operation Administration and Maintenance (OAM).

22. The eNB according to claim 17, wherein the processor is further configured to execute the instructions to:
receive a measurement result of parameters of a backhaul of the other eNB transmitted by the other eNB before transmitting the request message for inter-eNB functions to the other eNB or before receiving the request message for inter-eNB functions transmitted by the other eNB.

23. The eNB according to claim 22, wherein the processor is further configured to execute the instructions to:
   transmit a measurement request message to the other eNB before receiving the measurement result of parameters of a backhaul of the other eNB transmitted by the other eNB, wherein the measurement request message is used to request the other eNB to measure the parameters of its backhaul; and
   receive a measurement request response message fed back by the other eNB, the measurement request response message comprising measurement of parameters of a backhaul that can be performed by the other eNB, or the measurement request response message comprising information on rejection to the request for measurement.

24. The eNB according to claim 17, wherein the processor is further configured to execute the instructions to:
   transmit a measurement result of parameters of its backhaul to the other eNB before transmitting the request message for inter-eNB functions to the other eNB, or before receiving the request message for inter-eNB functions transmitted by the other eNB.

25. The eNB according to claim 24, wherein the processor is further configured to execute the instructions to:
   receive a measurement request message transmitted by the other eNB before transmitting the measurement result of parameters of its backhaul to the other eNB;
   determine according to the measurement request message, parameters of the backhaul that can be measured; and
   transmit a measurement request response message to the other eNB, the measurement request response message comprising the parameters of the backhaul that can be measured, or the measurement request response message comprising information on rejection to the request for measurement.

* * * * *